United States Patent [19]

Takama

[11] 4,173,896
[45] Nov. 13, 1979

[54] DEVICE FOR MEASURING ROTATIONAL SPEED OF A DIESEL ENGINE

[75] Inventor: Teruhiro Takama, Hino, Japan

[73] Assignees: C. Itoh & Co. Ltd., Osaka; Okuda Koki Co., Ltd., Tokyo, both of Japan

[21] Appl. No.: 936,123

[22] Filed: Aug. 23, 1978

[51] Int. Cl.² ............................................. G01P 3/48
[52] U.S. Cl. ..................................... 73/518; 324/166
[58] Field of Search ................... 73/518; 324/160, 166

[56] References Cited

FOREIGN PATENT DOCUMENTS 1087213 10/1967 United Kingdom ...................... 73/518
1089300 11/1967 United Kingdom ...................... 73/518

Primary Examiner—James J. Gill
Attorney, Agent, or Firm—J. Harold Nissen

[57] ABSTRACT

Disclosed is a device for measuring the rotational speed of a diesel engine. The device comprises a sensor element of electrostrictive effect type adapted to be detachably mounted on a delivery pipe of a fuel injection system of the diesel engine and having an intrinsic resonance frequency between 100 KHz and 10 MHz. A high frequency electric signal is transmitted from the sensor element in response to a high frequency oscillation generated in the fuel within the delivery pipe when fuel is injected. The device further comprises an amplifier, a converter, a wave shaping circuit, an integral circuit and an indicator. The high frequency electric signal is processed in the device and the rotational speed of the diesel engine is indicated by the indicator.

12 Claims, 13 Drawing Figures

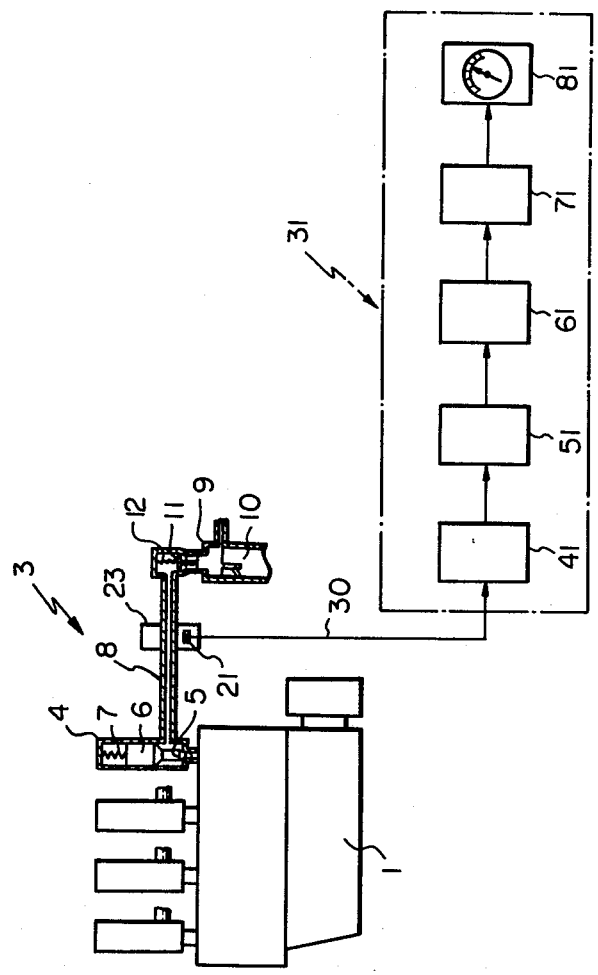

DEVICE FOR MEASURING ROTATIONAL SPEED OF A DIESEL ENGINE

BACKGROUND OF THE INVENTION

This invention relates to a device for measuring the rotational speed of a diesel engine.

The rotational speed of a gasoline engine, which uses an electric ignition, can easily be measured by utilizing an electric signal from the igniting source. However, a diesel engine does not use an electric ignition and, therefore an electric signal from the igniting source can not be utilized in a diesel engine. To overcome such inconvenience, a device for measuring the rotational speed of mechanical type or electromechanical type (dynamo type) is used and pressed against a rotational shaft of a diesel engine so that the rotational speed of the diesel engine is measured. In another method, a reflecting tape or magnetic substance is secured to the rotational portion of the diesel engine so that the rotational speed of the diesel engine is measured by means of a photoelectric type rotational meter or an electromagnetic type rotational meter which is disposed at a position adjacent to the rotational portion.

However, since a diesel engine which is installed in a vehicle does not have a rotational portion which is exposed to the outside, it is very difficult to easily press a device against the rotational shaft of the diesel engine or to readily secure a reflecting tape or magnetic substance to the rotational shaft of the diesl engine. As a result, the above-mentioned measuring methods are not desirable for practical use. Since in many automobile repair shops the rotational speed of a diesel engine cannot be measured easily in a short time, the rotational speed of a diesel engine is often estimated by listening to the sound emitted from the diesel engine. In a case where a reflecting tape or magnetic substance can be secured to a rotational shaft of a diesel engine, since each of the above-mentioned devices for measuring rotational speed requires one operator who must always check the device during the measuring operation, an operation wherein a function of a part is checked at a predetermined rotational speed, for example, the checking of a regulator installed in a charge dynamo at a predetermined constant rotational speed, must be effected by at least two operators and this results poor labor efficiency. Furthermore, oil or dust may adhere to the surface of the reflecting tape or magnetic substance, and then the measuring characteristics of the device is lowered. Therefore, the above-mentioned devices are not suitable for measuring the rotational speed of a diesel engine over a long period of time by installing the devices on a vehicle in which the engine is installed.

Recently, a method has been proposed for measuring the rotational speed of a diesel engine, in which method pulse-like mechanical pressure changes, each of which is generated when fuel is injected, are detected by a pressure sensing element which is installed within a fuel injection nozzle for supplying fuel into fuel chambers of the diesel engine or within a delivery pipe connecting a fuel injection nozzle with an injection pump. However, according to this method, since it is necessary to locate the pressure sensing element within the fuel injection nozzle or delivery pipe, the fuel nozzle or delivery pipe must be dismounted from the diesel engine and mounted again on the engine whenever the rotational speed of the diesel engine is measured. Therefore, this method is very troublesome. In addition, since the injection nozzle and delivery pipe influence the operating characteristics of the diesel engine, the operating characteristics of the diesel engine are degraded when the injection nozzle and delivery pipe is not adequately mounted and adjusted. Consequently, this method requires a special skill for mounting the sensing element and is not desirable for practical use. Furthermore, since the sizes of the injection nozzles and delivery nozzles are different from each other in accordance with the types of vehicles, various types of the injection nozzles and delivery pipes, both of which have sensing elements mounted therein, must be prepared when the rotational speed of various types of diesel engines is measured in a repair shop. This is not economical.

Another method for measuring the rotational speed of a diesel engine is proposed in Japanese Utility Model Application Laid Open No. 277-77. In this method, local pressure changes generated in a delivery pipe when fuel is injected under a high injecting pressure are detected as electric signals by means of an oscillator which has an intrinsic resonance frequency and which is disposed in abutment with the delivery pipe, so that the rotational speed of the engine is measured by utilizing the electric signal. According to this method, dismounting and mounting of the fuel injection nozzle and delivery pipe, and the adjustment required in the mounting and dismounting become unnecessary. As a result, it would normally be expected that the rotational speed of a diesel engine can be easily measured without causing a degradation of the operating characteristics of the diesel engine. However, the device disclosed in Japanese Utility Model Application Laid Open No. 277-77 has some defects in the specifications thereof, especially the allowable range of intrinsic resonance frequency and construction, and in the processing of the electric signals obtained. Therefore, the device is not preferable for the practical use.

SUMMARY OF THE INVENTION

An object of the present invention is to provide a device for measuring the rotational speed of a diesel engine, which device is an improvement over the device disclosed in Japanese Utility Model Laid Open No. 277-77 and in which the specifications of the oscillator, such as the range of the intrinsic resonance frequency and the electric circuit for processing the electric signal from the oscillator, are set forth in detail, and as a result, the rotational speed of a diesel engine can be detected and measured.

The above-mentioned object of the present invention is achieved by a device for detecting the rotational speed of a diesel engine with a fuel injection system. The device comprises a sensor element, an amplifier, a converter and a wave shaping circuit. The sensor element is adapted to be mounted on the fuel injection system and has an intrinsic resonance frequency which is considerably larger than the rotational speed of the diesel engine to be measured, so that it transmits a high frequency electric signal in response to a high frequency oscillation generated in fuel within the fuel injection system when the fuel is injected. The amplifier has a tuning frequency which is substantially the same as the intrinsic resonance frequency of the sensor element, so that it tunes and amplifies the high frequency signal from the sensor element. The converter converts the tuned and amplified high frequency electric signal into a low frequency signal which corresponds to the fuel injection operation. The wave shaping circuit shapes the low frequency signal from the converter into a pulse signal which has a predetermined amplitude and a predetermined pulse width and the circuit applies the pulse signal into an indicator so that the indicator indicates the rotational speed of the diesel engine.

In an embodiment according to the present invention, which embodiment is illustrated in the accompanying drawings, the indicator includes a circuit with a predetermined time constant, so that it integrates the pulse signal from the wave shaping circuit and indicates the rotational speed of the diesel engine by indicating the potential difference through the opposite terminals of a certain part, such as a condenser, in the circuit by means of a voltmeter. In another embodiment, which is not illustrated in the accompanying drawings, a digital counter is utilized as an indicator for counting the number of pulse, so that the rotational speed of a diesel engine is indicated. In a further embodiment, which is not illustrated in the accompanying drawings, a stroboscope is utilized as an indicator and the pulse signal from the wave shaping circuit is utilized as a trigger signal of the stroboscope, so that the stroboscope can be utilized as a timing light for checking the injection timing of the diesel engine. In a still further embodiment, which is not illustrated in the accompanying drawings, a Brown-tube oscilloscope is utilized and the pulse signal from the wave shaping circuit is utilized as a signal for trigger sweeps of the Brown-tube oscilloscope, so that an oscillogram of a rotation of the diesel engine with regard to the operating characteristics, such as fuel injection pressure, can be obtained, and the obtained oscillogram can be utilized for checking whether there is any defective fuel injection system in the multi-cylinder engine and the cylinder number of the defective fuel injection system.

A device according to the present invention does not directly detect the pressure change in the fuel injection system which is caused once every fuel injection, but detects a high frequency oscillation in fuel within the fuel injection system caused by the rapid movement of the plunger in the fuel pump when the fuel is injected. The high frequency oscillation is considerably higher than the number of movements of the plunger in the fuel pump. The device detects the rotational speed of the diesel engine by detecting and processing the high frequency signal generated by the high frequency oscillation. The high frequency oscillation which is detected by the present invention is distinguished from the usual low frequency oscillation which is caused by the rotation of the engine and, therefore, the high frequency oscillation can be detected separately from the low frequency oscillation by a sensor element which is disposed on the outer surface of the fuel passage. Therefore, the device according to the present invention can obviate such troublesome operations as dismounting the fuel injection system of the diesel engine, mounting the oscillator within the fuel injection system and adjusting the fuel injection system. The high frequency oscillation is rapidly attenuated when it is transmitted through the wall of the pipe and, therefore, a sensor element disposed on one of the fuel injection systems of a multi-cylinder engine can be prevented from detecting high frequency oscillations which are generated in another fuel injection system and can acurately detect the rotational speed of the diesel engine.

The high frequency oscillation in the fuel located within the fuel injection system generated by the fuel injection operation, which oscillation is utilized according to the present invention, has a considerably higher frequency than that of such noise as the mechanical vibration caused by the rotational movement of the diesel engine, vibration due to the burning of the combustible gas mixture within the combustion chambers of the diesel engine and the mechanical vibration caused by the mechanical displacement of the injective valves. Accordingly, when the intrinsic resonance frequency of the sensor element is selected to be a certain high frequency which is considerably higher than the rotational speed of the diesel engine, the sensor element can only resonate at the high frequency oscillation caused by the pressure vibration in the fuel within the fuel injection system. If the maximum rotational speed of the diesel engine is taken into consideration, it is preferable to select an intrinsic resonance frequency of the sensor element equal to or more than 100 KHz. Manufacturing technology regarding sensor elements at present can provide a sensor element of up to 10 MHz. Of course, even a sensor element which has an intrinsic resonance frequency slightly higher or lower than the range between 100 KHz and 10 MHz can also be utilized. However, when the intrinsic resonance frequency of the sensor element is excessively low, the sensor element may have a tendency to detect the above-mentioned noise caused by the mechanical vibration. On the other hand, as the intrinsic resonance frequency of the sensor element is increased, the size of the sensor element is decreased and the size of a sensor block in which the sensor element is installed is also decreased, and the sensor element can easily detect the high frequency without attenuation by the sensor block. However, when the size of the sensor element is excessively small, a problem of weakness of the sensor element may arise. At the present time, if the required intrinsic resonance frequency is excessively high, for example more than 10 MHz, it is very difficult to obtain a suitable sensor element from commercially available sensor elements. As a result, it is desirable to select an intrinsic resonance frequency of the sensor element between 100 KHz and 10 MHz, more preferably between 1 MHz and 5 MHz. However, it should be noted that in a device according to the present invention, a sensor element having an intrinsic resonance frequency higher than 10 MHz may be utilized from a point of view of the principle applied in the present invention. The sensor element may be a piezo-electric element, more specifically, an element of the electrostrictive effect type, for example one selected from the TDK 51 c series sold by the TDK Electronics Co., Ltd. The intrinsic resonance frequency of the sensor element is 1.5 MHz in an embodiment explained later with reference to the accompanying drawings.

The sensor element according to the present invention may be installed within a sensor block and the sensor block may be secured on the outer surface of the delivery pipe of the fuel injection system. In this case, a concavity which corresponds to the outer shape of the delivery pipe may be formed on the sensor block so that the concavity is engaged with the delivery pipe, and then, the sensor block is secured on the delivery pipe by means of one or more threaded screws or one or more fastening springs. As a result of this construction, the sensor element can easily be dismounted from and mounted on the delivery pipe and a measuring device having such a sensor element is easy to move and use efficiently. On the other hand, when the measuring device is installed in a vehicle, the sensor element thereof may be secured to the fuel injection system.

As will be apparent from the above explanation, the device according to the present invention is preferably used on a diesel engine provided with a fuel injection system comprising a fuel injection pump, a fuel injection nozzle and a delivery pipe connected therebetween, because the sensor element can easily be mounted on the fuel injection system. However, the device according to the present invention may be utilized for measuring the rotational speed of a diesel engine which has a fuel injection system different from that mentioned above.

Some embodiments according to the present invention will now be explained in detail with reference to the accompanying drawings.

BRIEF DESCRIPTION OF THE DRAWINGS

FIG. 1 is a fragmentary constructional view of a device for measuring the rotational speed of a diesel engine according to the present invention;

DETAILED DESCRIPTION OF THE INVENTION

Figure 2A:
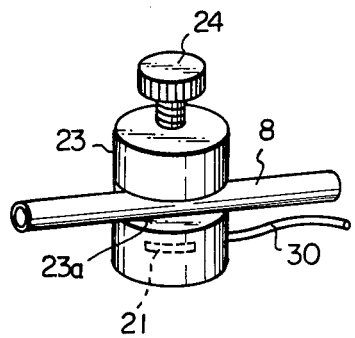
FIGS. 2A through 2C are perspective views of a sensor block which can be utilized in the device illustrated in FIG. 1.

Referring to FIG. 1, a diesel engine is provided with four combustion chambers (not shown), each of which is communicated with a fuel supply (not shown) via a fuel injection system 3. The fuel injection system 3 comprises a fuel injection nozzle 4, a delivery pipe 8, one end of which is connected to the fuel injection nozzle 4, and a fuel injection pump 9 which is connected to another end of the delivery pipe 8 and is of well known type. More specifically, the fuel injection pump 9 includes a plunger 10, which reciprocates vertically in synchronization with the movement of a crankshaft (not shown) of the diesel engine 1, a valve 11 positioned above the plunger 10 and a compression spring 12, which urges the valve downward so that the fuel injection pump 9 pressurizes the fuel and pumps it up in synchronization with the operation of the diesel engine 1. The fuel injection nozzle 4 includes a nozzle valve seat 5, a nozzle needle valve 6, which cooperates with the nozzle valve seat 5, and a compression spring 7 which urges the nozzle needle valve 6 towards the nozzle valve seat 5, so that the fuel injection nozzle 4 atomizes and injects the fuel which is supplied from the fuel injection pump 9 through the delivery pipe 8, into the combustion chamber (not shown).

Figure 2B:
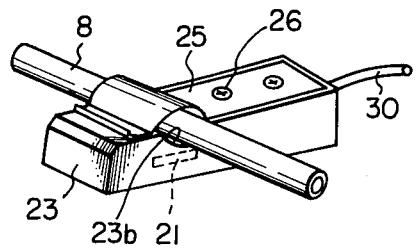
Figure 2C:
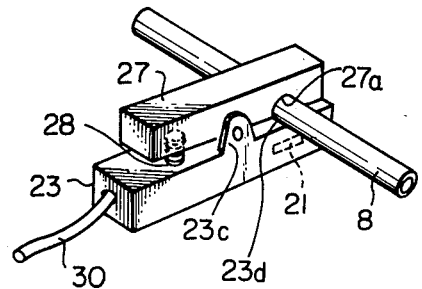

A sensor block 23, which has a sensor element 21 installed therein, is deattachably mounted on the outer surface of the delivery pipe 8. The sensor block 23 illustrated in FIG. 2A has a cylindrical shape and a groove 23 formed on the side of the cylindrical shape, which groove is slightly larger than the diameter of the delivery pipe 8, so that the sensor block 23 is securely mounted on the delevery pipe 8 by means of a screw bolt 24 which is threaded at the upper portion of the sensor block 23. The sensor block 23 illustrated in FIG. 2B has a groove 23 formed on the upper surface thereof, for receiving the delivery pipe 8, and a spring plate 25, which is positioned from above and secured to the sensor block 23 by means of set screws 26. The sensor block 23 illustrated in FIG. 2C has a push bar 27, which is pivoted to a pair of projections 23c formed on the upper surface of the sensor block 23, and a compression spring positioned between the rear end of the push bar 27 and the upper surface of the sensor block 23, so that the sensor block 23 grasps the delivery pipe 8. The push bar 27 and the sensor block 23 have grooves 23d and 27a formed thereon, respectively, for receiving the delivery pipe 8.

The sensor chamber 21 installed within the sensor block 23 has an intrinsic resonance frequency which is considerably higher than the rotational speed of the diesel engine 1, preferably between 100 KHz and 10 MHz, for example 1.5 MHz. It is preferable to use a piezo-electric element, more specifically an element of the electrostrictive effect type. The sensor element 21 is wired to the body 31 of the rotational speed measuring device via a shielding wire 30 as illustrated in FIG. 1. The body 31 is provided therein with:

an amplifier 41 which has a tuning frequency substantially the same as the intrinsic reasonance frequency of the sensor element;

a converter 51 which converts the tuned and amplified high frequency electric signal into a low frequency signal corresponding to the fuel injection;

a wave shaping circuit 61 which shapes the low frequency signal from the converter 51 into a pulse signal having a predetermined amplitude and a predetermined pulse width;

an integral circuit 71 which integrates the pulse signal from the wave shaping circuit 61, and;

a voltmeter 81 which indicates the potential difference within the integral circuit 71.

The voltmeter has a scale which is graduated in accordance with the rotational speed of the diesel engine 1, so that the rotational speed of the diesel engine 1 can be read on the voltmeter 81.

Figure 3:
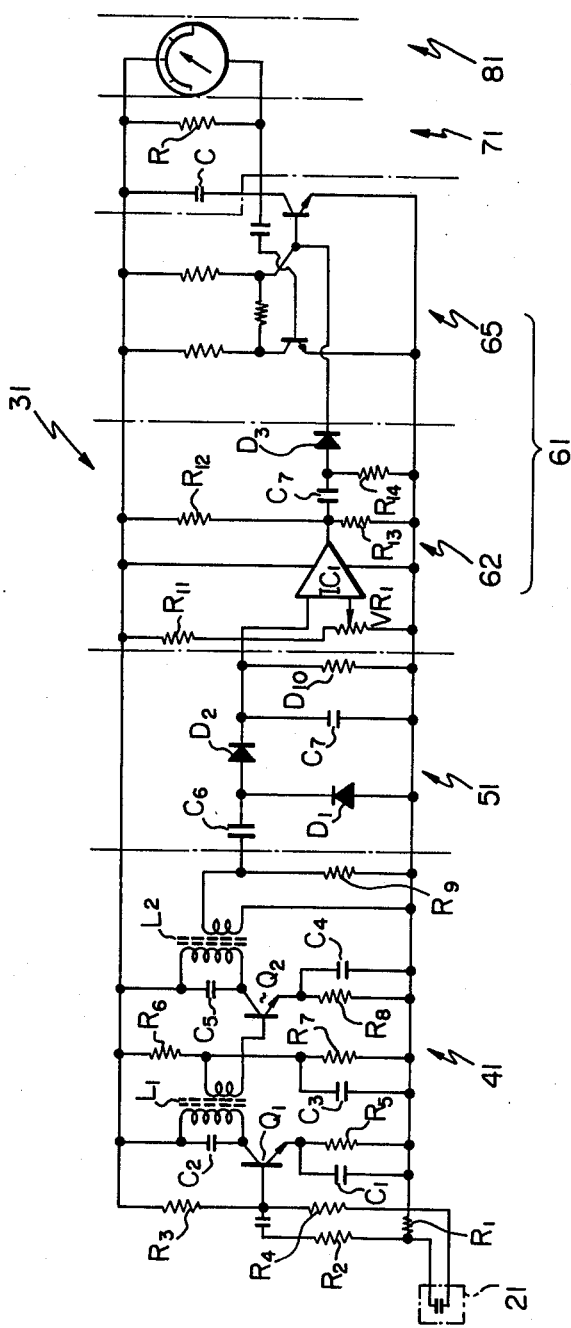
FIG. 3 is a circuit diagram of the device illustrated in FIG. 1.

An example of an actual circuit in the body 31 of the rotational speed measuring device is illustrated in FIG. 3. The high frequency amplifier 41 amplifies a high frequency signal which is tuned by the tuning circuit, the tuning frequency of which is determined by capacitances $C_2$ and $C_5$ and reactances $L_1$ and $L_2$. The converter 51 comprises two diodes $D_1$ and $D_2$, and converts the tuned and amplified high frequency signal into a low frequency signal by detecting the high frequency signal by means of the diode $D_1$ and $D_2$. The wave shaping circuit 61 includes a comparator 62 which is constituted by an IC element $IC_1$ and which compares the signal from the converter 51 with a predetermined standard level voltage, which is predetermined by a variable resistor $VR_1$, and generates a pulse signal when the signal from the converter exceeds the predetermined standard level voltage. The wave shaping circuit further includes a monostable multivibrator 65, which is triggered by the pulse signal from the comparator 62 and generates an output pulse having a predetermined pulse width and a predetermined amplitude. The monostable multivibrator 65 can be constructed by a known circuit. The integral circuit 71 which comprises a resistor R and a capacitance C, and has a predetermined time constant T equal to the multiple R and C, is wired to the monostable multivibrator 65. The voltage through the terminals of the capacitance C in the integral circuit 71 is read by a voltmeter 81. The resistor R can be replaced by an internal resistance of the voltmeter 81.

The operation of the device illustrated in FIG. 1 will now be explained with reference to FIGS. 4A through 4H.

Figure 4A:
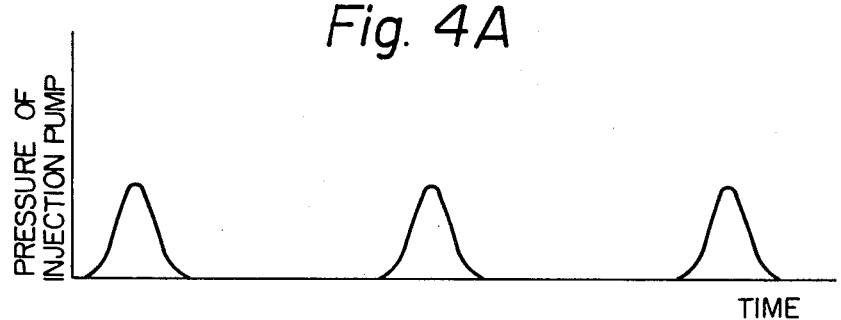
FIGS. 4A through 4H are diagrams of signals in the circuit illustrated in FIG. 3.
Figure 4B:
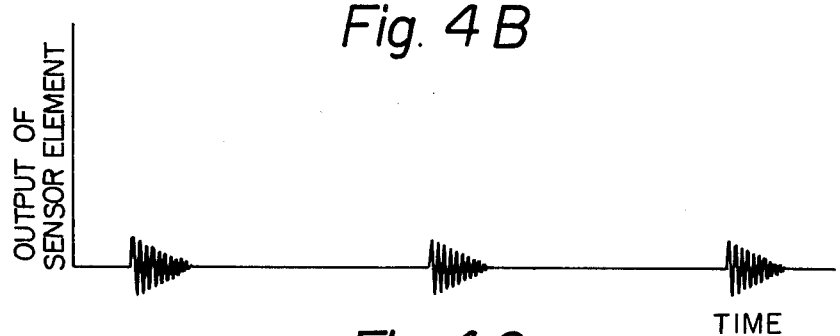
Figure 4C:
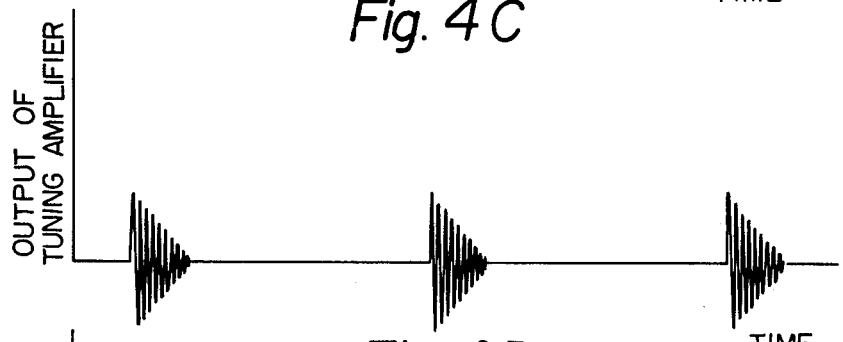
Figure 4D:
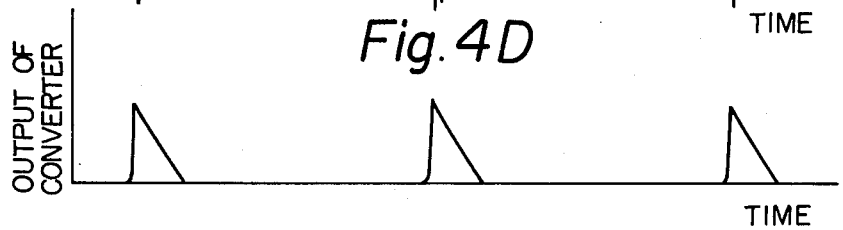
Figure 4E:
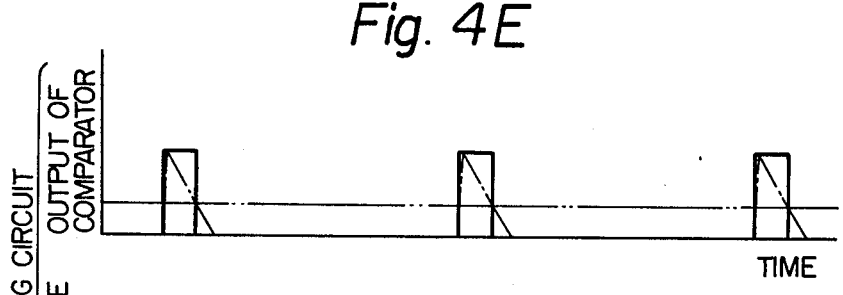
Figure 4F:
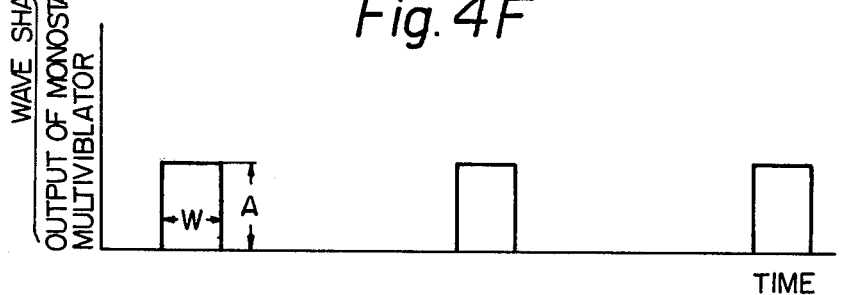
Figure 4G:
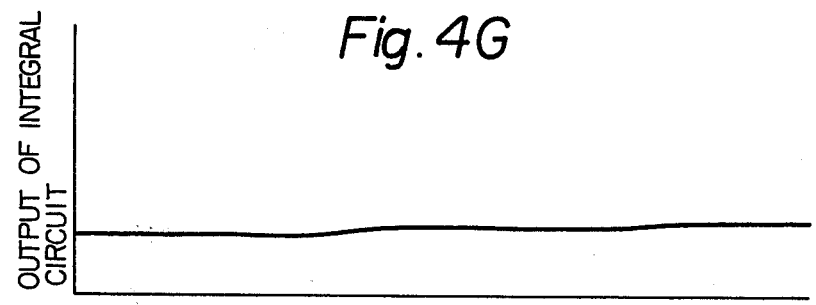
Figure 4H:
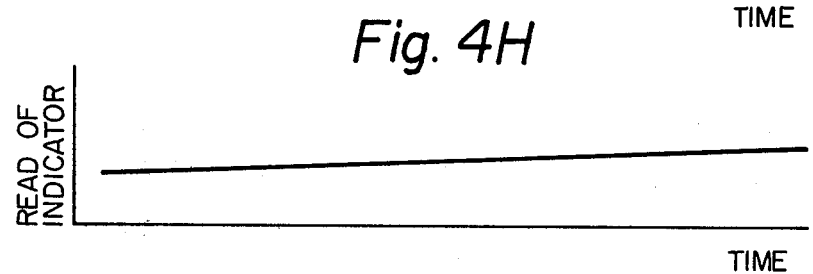
Figure 3:
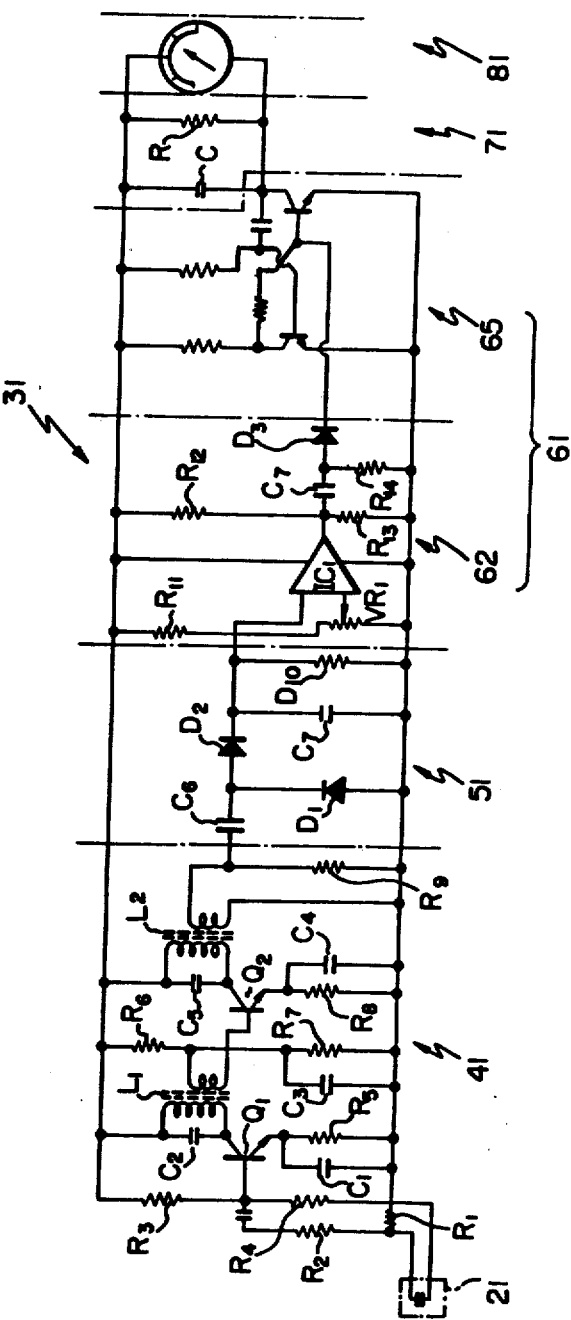

When the fuel injection pump 9, which is illustrated in FIG. 1, is actuated in synchronization with the crankshaft of the diesel engine 1, the total pressure within the fuel injection system 3 is increased and becomes zero again, as illustrated in FIG. 4A, when the fuel injection from the fuel injection nozzle into the combustion chamber is completed. When the fuel injection nozzle is moved rapidly, a high frequency oscillation of local pressure is generated in the fuel within the fuel injection system, and then, the sensor element 21 (FIG. 1) transmits a high frequency signal which corresponds to the intrinsic resonance frequency thereof, as illustrated in FIG. 4B. It has been observed in many experiments that such high frequency oscillation is generated in the fuel when the fuel injection pump is rapidly moved. However, it is not certain whether the starting point of the high frequency oscillator deviates from that of the total pressure, as illustrated in FIGS. 4A and 4B. It has been also observed that the wave shape of high frequency oscillation is differentiated in accordance with the structural conditions of the fuel injection system. The high frequency signal from the sensor element 21 (FIG. 1) is tuned and amplified by means of the amplifier 41, and a signal of the predetermined frequency is amplified, as illustrated in FIG. 4C. Then, the amplified high frequency signal is detected by the converter 51 (FIG. 1) so that a low frequency signal is obtained, as illustrated in FIG. 4D. The output signal from the converter is compared in the comparator 62 (FIG. 3) with the standard level voltage, which is illustrated by a two-dot-dash line in FIG. 4E, and then, a pulse signal is generated as illustrated in FIG. 4E. The pulse signal is transmitted into the monostable multivibrator 65 (FIG. 3) and utilized to trigger the monostable multivibrator 64 (FIG. 3), so that the pulse signal is shaped into a shaped pulse having a predetermined pulse width W and a predetermined amplitude A, as illustrated in FIG. 4F. Since a pulse is generated from the wave shaping circuit 61 (FIG. 1) whenever fuel injection into one of the combustion chambers of the diesel engine 1 (FIG. 1) is effected, the number of pulses is proportional to the rotation speed of the diesel engine 1 (FIG. 1). Furthermore, since the pulse width and the amplitude of the pulses from the wave shaping circuit 61 (FIG. 1) are constant, when the pulse signal is integrated for a certain time interval, this results in a value which corresponds to the number of the generated pulses counted in the certain time interval. Therefore, the rotational speed of the diesel engine can be known by knowing the integrated value. In the device illustrated in FIG. 1, an output pulse signal from the wave shaping circuit 61 is introduced into the integral circuit 71, which has a predetermined time constant, and is integrated by the integral circuit 71 for the time interval equal to the predetermined time constant and then, the integrated valve is read via the voltmeter 81 which indicates the rotational speed.

What we claim is:

1. A device for detecting the rotational speed of a diesel engine with a fuel injection system comprising:
    a sensor element, adapted to be mounted on said fuel injection system and having an intrinsic resonance frequency which is considerably larger than the rotational speed of said diesel engine to be measured, for transmitting a high frequency electric signal in response to a high frequency oscillation generated in the fuel within said fuel injection system when said fuel is injected;
    an amplifier, having a tuning frequency which is substantially the same as said intrinsic resonance frequency of said sensor element, for tuning and amplifying said high frequency signal from said sensor element;
    a converter for converting said tuned and amplified high frequency electric signal into a low frequency signal corresponding to fuel injection, and;
    a wave shaping circuit for shaping said low frequency signal from said converter into a pulse signal having a predetermined amplitude and a predetermined pulse width, said wave shaping circuit applies said pulse signal into an indicator in accordance with said rotational speed of said diesel engine.

2. A device according to claim 1 which further comprises a circuit with a predetermined time constant as said indicator for integrating said pulse signal from said wave shaping circuit and for indicating said rotational speed of said diesel engine.

3. A device according to claim 1, wherein said intrinsic reasonance frequency of said sensor element is equal to or more than 100 KHz.

4. A device for detecting a rotational speed of a diesel engine with a fuel injection system comprising:
    a sensor element, adapted to be mounted on said fuel injection system and having an intrinsic reasonance frequency equal to more than 100 KHz, for transmitting a high frequency electric signal in response to a high frequency oscillation generated in the fuel within said fuel injection system when fuel is injected;
    an amplifier, having a tuning frequency substantially the same as said intrinsic reasonance frequency of said sensor element, for tuning and amplifying said high frequency signal from said sensor element;
    a converter for converting said tuned and amplified high frequency electric signal into a low frequency signal corresponding to fuel injection;
    a wave shaping circuit for shaping said low frequency signal from said converter into a pulse signal of a predetermined amplitude and a predetermined pulse width, and;
    an indicator means provided with a circuit having a predetermined time constant, for integrating said pulse signal from said wave shaping circuit and being actuated in accordance with said rotational speed of said diesel engine.

5. A device according to claim 4, wherein said sensor element is a piezo-electric element.

6. A device according to claim 5, wherein said piezo-electric sensor element is of the electrostrictive effect type.

7. A device according to claim 4, wherein said fuel injection system of said diesel engine comprises a fuel injection pump, a nozzle for injecting fuel into a combustion chamber of said diesel engine and a delivery pipe communicating said fuel injection pump with said fuel injecting nozzle, and wherein said sensor element is adapted to be deattachably mounted on said delivery pipe.

8. A device according to claim 4, wherein said intrinsic resonance frequency of said sensor element is between 100 KHz and 10 MHz.

9. A device according to claim 4, wherein said frequency converter comprises a pair of diodes.

10. A device for measuring the rotational speed of a diesel engine having a fuel injection system installed therein provided with a fuel injection pump, a nozzle for injecting fuel into a combustion chamber of said diesel engine and a delivery pipe communicating said fuel injection pump with said fuel injecting nozzle, which device comprises:

- a sensor element of electrostrictive effect type adapted to be deattachably mounted on said delivery pipe and having an intrinsic resonance frequency between 100 KHz and 10 MHz, for transmitting a high frequency electric signal in response to a high frequency oscillation generated in the fuel within said delivery pipe when fuel is injected;
- an amplifier, having a tuning frequency substantially the same as said intrinsic resonance frequency of said sensor element, for tuning and amplifying said high frequency from said sensor element;
- a converter, comprising a pair of diodes, for detecting said tuned and amplified high frequency electric signal into a low frequency signal;
- a wave shaping circuit for modulating said low frequency signal from said converter into a pulse signal with a predetermined amplitude and a predetermined pulse width;
- an integral circuit provided with a circuit having a predetermined time constant, for integrating said pulse signal from said wave shaping circuit, and;
- an indicator for indicating said rotational speed of said diesel engine in accordance with the integrated electric potential in said integral circuit.

11. A device according to claim 10, wherein said sensor element is installed within a sensor block and said sensor block has a concavity formed thereon for engaging with the outer surface of said delivery pipe.

12. A device according to claim 10, wherein said intrinsic resonance frequency of said sensor element is between 1 MHz and 5 MHz.

* * * * *

UNITED STATES PATENT AND TRADEMARK OFFICE
CERTIFICATE OF CORRECTION

PATENT NO. : 4,173,896
DATED : November 13, 1979
INVENTOR(S) : Teruhiro Takama

It is certified that error appears in the above-identified patent and that said Letters Patent are hereby corrected as shown below:

Sheet 3 of the drawings should be deleted to appear as per attachment.

Signed and Sealed this

Tenth Day of June 1980

[SEAL]

Attest:

SIDNEY A. DIAMOND

*Attesting Officer*  *Commissioner of Patents and Trademarks*